Sept. 24, 1935.　　　I. A. WEAVER　　　2,015,357
VEHICLE LIFT
Filed June 24, 1933　　　3 Sheets—Sheet 1

Inventor:
Ira A. Weaver
By Walter M. Fuller Atty.

Sept. 24, 1935.  I. A. WEAVER  2,015,357
VEHICLE LIFT
Filed June 24, 1933  3 Sheets-Sheet 2
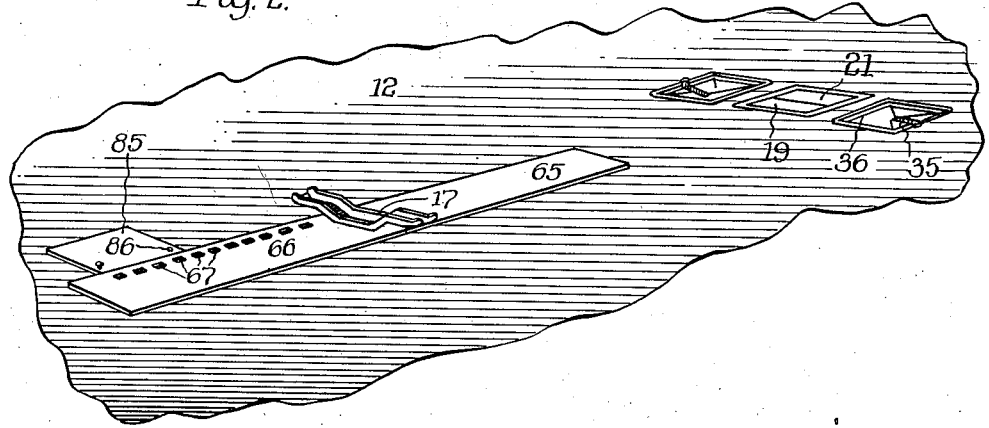
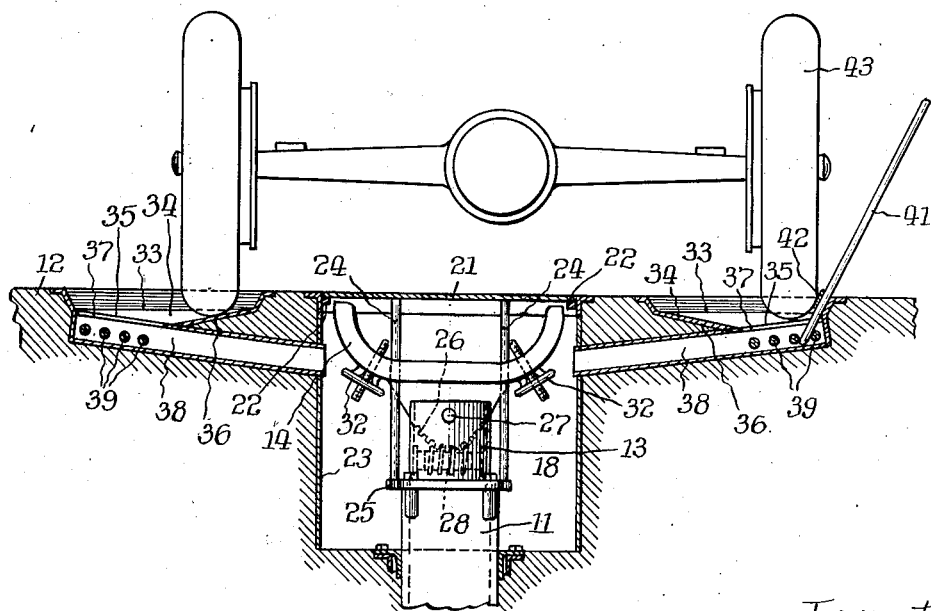

Sept. 24, 1935. I. A. WEAVER 2,015,357
VEHICLE LIFT
Filed June 24, 1933 3 Sheets-Sheet 3
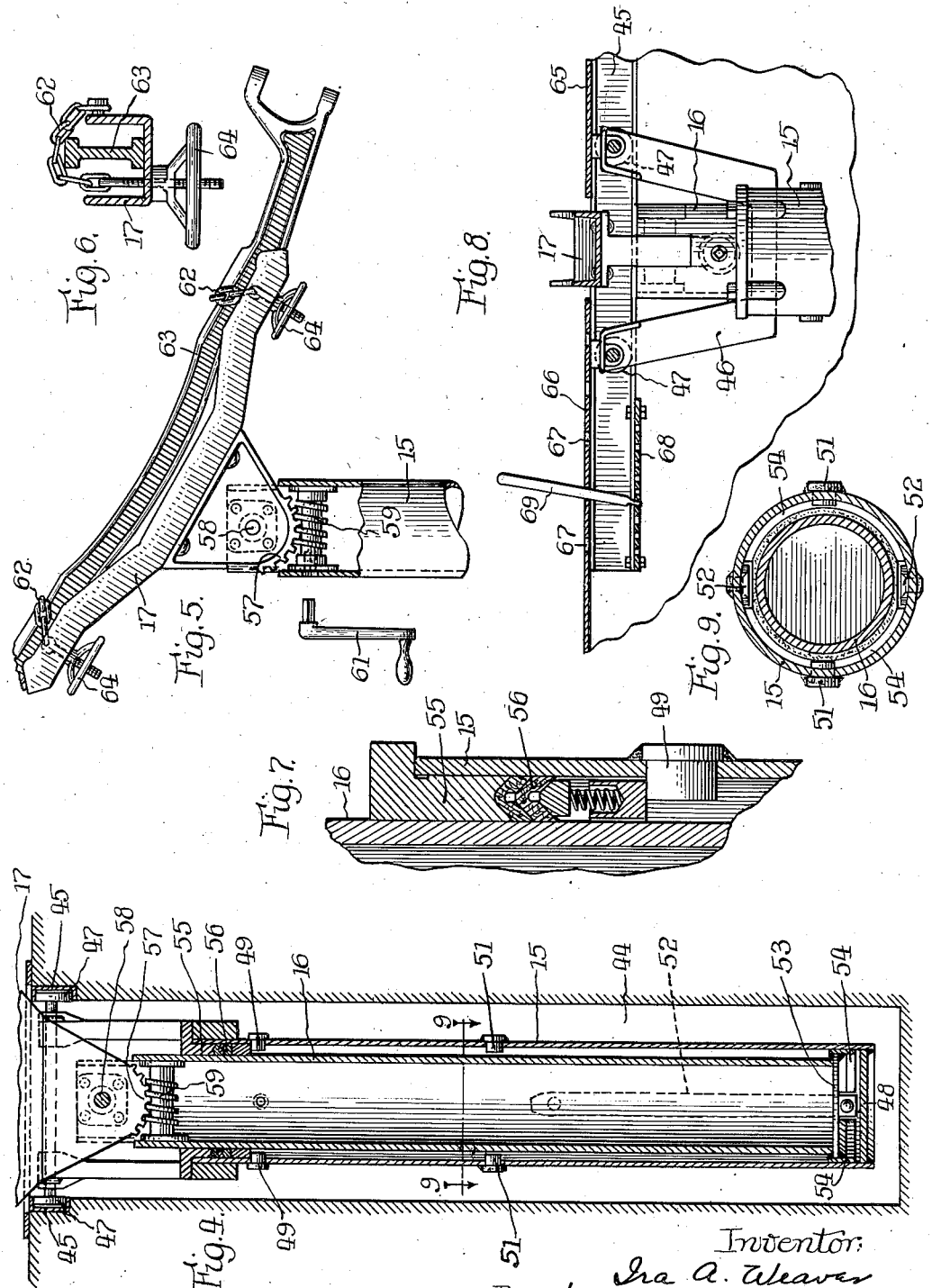

Patented Sept. 24, 1935

2,015,357

UNITED STATES PATENT OFFICE 2,015,357

VEHICLE LIFT

Ira A. Weaver, Springfield, Ill., assignor to Weaver Engineering Company, Springfield, Ill., a corporation of Illinois Application June 24, 1933, Serial No. 677,413

19 Claims. (Cl. 214—1)

My invention pertains to certain features of novelty and advantage in vehicle-lifts and, as to some of its characteristics, it concerns more especially elevating appliances of this general type employing a pair of hoisting, fluid-actuated plungers or pistons operating in upright cylinders or casings.

One object of the invention is to supply improved centering means for the rear wheels of the vehicle to be lifted and their associated differential-housing.

Another aim of the invention is to provide a structure of this general type which in large measure descends to or below the floor level so as to impose but slight obstruction when not in use.

A further purpose of the invention is to make a lift in which the dirt, oil, grease or the like, which is likely to fall from the wheels or bearings will be readily disposed of.

The means of adjusting one of the elevating plungers to adapt the appliance for satisfactory operation with vehicles of different lengths of wheel base constitutes another salient feature of the structure.

The provision of means for the sidewise tilting of the elevated vehicle is novel and useful.

Again, the details of structure of the pistons or plungers and their encasing cylinders lend added advantage to the appliance.

To the satisfactory accomplishment of these and other desirable objects a present, preferred embodiment of the invention has been provided and illustrated in the accompanying drawings forming a part of this specification, and, for simplicity, like reference numerals have been used to designate the same parts throughout the several views of the drawings.

In these drawings:

Figure 2 illustrates a part of the garage floor or ground surface with the parts of the lifting appliance in their lowermost positions;

Figure 3 is a vertical cross-section through that part of the appliance adapted to elevate the rear portion of the vehicle;

Figure 4 is a vertical section through the cylinder and its plunger designed to raise the front axle of the automobile;

Figure 5 is a fragmentary view of the top part of the elevating plunger for the front axle and shows its axle-engaging saddle tilted sidewise;

Figure 6 is a cross-section indicating the means employed to chain or fasten the front axle to the plunger saddle whereby to permit sidewise tipping of the elevated car;

Figure 7 is an enlarged detail of the stuffing-box constructions used for the reciprocatory plungers;

Figure 8 is a fragmentary, vertical, longitudinal section showing the hand-operated means for adjusting the position of the front lifting mechanism whereby to adapt the appliance as a whole to vehicles of different lengths of wheel base; and Figure 9 is an enlarged horizontal cross-section on line 9—9 of Figure 4.

Figure 1:
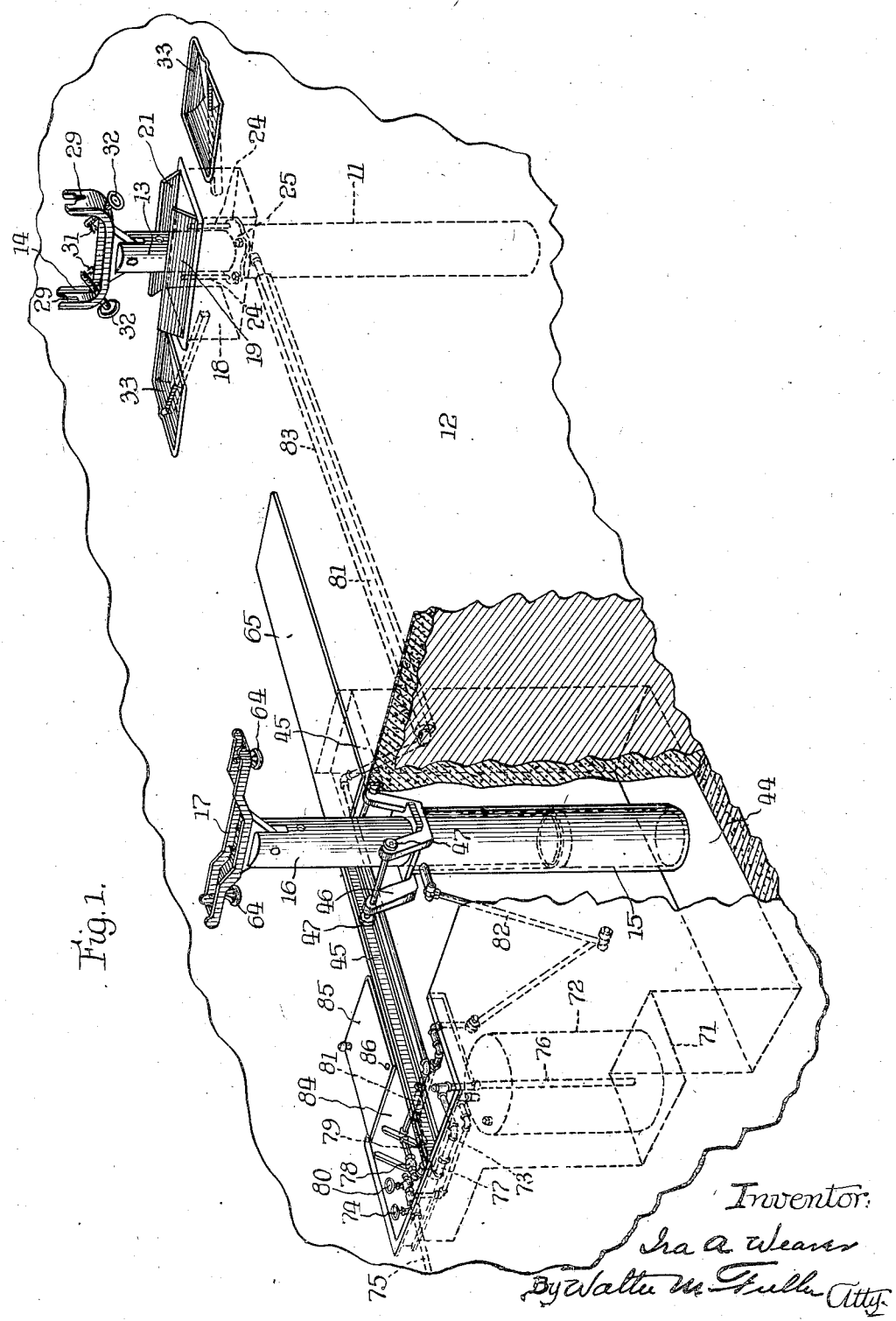
Figure 1 shows the new apparatus in perspective and with parts broken away.

Referring to the drawings, it will be perceived that the new and improved vehicle elevating and lowering appliance includes a stationary upright cylinder 11 which may be set or supported in any approved manner beneath the floor or ground surface 12, such cylinder accommodating a reciprocatory lifting plunger 13 fitted at its top end with a saddle 14 suitably shaped to engage the differential-housing of the rear-axle structure of the automobile, the apparatus embracing also a second or front-axle, vertically-disposed cylinder 15 and its associated plunger 16 fitted at its top with a seat or saddle 17 designed and shaped to cooperate with the front axle of the vehicle.

Referring now more specifically to that portion of the mechanism adapted to elevate the rear end of the automobile, the upper end of cylinder 11 is located in a cavity, compartment or pit 18 just below the floor level of the garage if the apparatus is used indoors or just below the ground level if the appliance is used out-of-doors, and this space is normally covered by a pair of hinged doors 19 and 21 located at the floor or ground level and supported in their ordinary horizontal position by flanges or ribs 22, 22 (Figure 3) on the inner surfaces of opposite walls of a metal lining 23 for the pit 18 and also supported by a plurality of upstanding rods 24 mounted at their lower ends on a head 25 carried by the cylinder 11, and projecting through holes in saddle 14.

Saddle 14 on its underside has a worm-sector 26 rockingly mounted at 27 in the upper slotted end of the plunger 13, such sector being in mesh with a worm 28 revolubly mounted inside of the plunger and adapted to be turned to rock the sector and saddle by a detachable handle designed to fit in its angular interior through a registering hole in the wall of the plunger, all of which will more fully appear in connection with the like or similar construction of the front-axle cylinder described in detail hereinafter.

As is shown in Figure 1, the bifurcated head or saddle 14 is slotted at 29, 29 to receive any trussrods, if the differential-housing of the vehicle is equipped with such.

Saddle 14 is also fitted with chains 31, 31 and manually-operated, screw-actuated, tightening means 32, 32 by means of which the rear axle assembly of the vehicle may be firmly and securely clamped to the saddle if the latter and the vehicle elevated thereby are to be tilted sidewise after having been raised.

As is presented in full lines in Figure 3, when the plunger 13 and its seat or saddle 14 are in their lowermost positions, the saddle is wholly accommodated in the space or pit 18 directly beneath the then closed horizontal trap-doors 19, 21.

When the plunger 13 and its rear-axle head 14 ascend, the upward movement of the latter automatically opens the doors which remain open in somewhat oppositely-inclined positions, as shown in Figure 1, by bearing against the opposite sides of the plunger.

When the associated plunger and saddle descend into the pit 18, the doors automatically close again by their own weight, as will be readily understood.

It is sometimes difficult to center the differential-housing of the automobile accurately over the saddle 14, especially when the latter is concealed in its compartment 18, by merely driving the car into place, and, to facilitate such centering operation, the following specified instrumentalities have been provided.

At the opposite sides of the chamber 18, the floor 12 is fitted with a pair of rectangular, metallic, pocket members or depression pans 33, 33 set in the floor at equal distances from and in alignment with the saddle 14, each such part having an oppositely-inclined base 34, the outer part 35 of which slopes inwardly downwardly and the inner part 36 of which is inclined upwardly inwardly, all as is clearly shown in Figure 3.

From the illustration, it will be apparent that the top margins of these pans are on approximately the level of the floor or ground surface.

At its center each part 35 is slotted at 37 in the direction of the saddle 14 which gives it an open connection with the interior of an underlying tube or pipe 38 sloping downwardly for delivery of its contents into the pit 18 through the corresponding wall of the casing 23, tube or pipe 38 directly beneath the slot 37 having a plurality of spaced, cross, fulcrum rods 39 fixed therein.

In order to provide such a construction the top of the pipe or tube 38 is slotted in register with the slot 37 and the two members are welded together.

After the automobile has been driven into place with its rear wheels in the two depression members, if it is found that the rear portion of the car is laterally off center with respect to the saddle 14, as shown in full lines in Figure 3 and as can be readily ascertained by merely noting the positions of the wheels in the depressions, it can be easily shifted into proper register with the saddle by inserting the lower end of a lever 41 between two of the rods or pins 39 and prying the car over while the lever, or a plate 42 thereon, presses against the outer face of the rubber tire 43 of the wheel.

In this way, an incorrectly located rear end of the car may be properly positioned with facility while the tires of the wheels are in the depression members, which assure that the rear axle is over the saddle even though the car requires sidewise displacement in the manner stated to complete the exact registration of the differential-housing with the saddle.

Referring to Figure 1, it will be observed that under the front part of the automobile there is a much larger and deeper chamber or pit 44 having channel-bar tracks 45, 45 embedded in the top portions of its opposite, longitudinal walls which are disposed lengthwise the apparatus, the front-axle cylinder 16 being mounted in a carriage or truck 46 having four carrying-wheels 47, 47 traveling on the lower flanges of the bars 45, 45, whereby the front-axle seat 17 may be easily adjusted toward or from the rear-axle saddle 14 to conform to the length of wheel-base of the vehicle to be elevated.

The constructions of both cylinders and their plungers are substantially alike, and an understanding of the structural features of the front cylinder and its plunger will suffice for both.

As is shown in Figure 4, the lower end of the cylinder 15 is closed by a disc 48 welded therein. Opposite sides of the cylinder each have two spaced plugs or lugs 49, 51—49, 51 aligned longitudinally of the cylinder and projecting thereinto.

Also in the lower part of the cylinder and terminating short of the height of the lower pins 51, 51 are two vertically-disposed guide-bars 52 riveted against the inner surface of the cylinder diametrically opposite one another and at 90° to the pins 51.

The lower end of the hollow piston or plunger 16 is closed by a round plate 53 welded thereto and of a diameter slightly larger than the external diameter of the plunger, and to the periphery of such disc 53 two arcuate plates 54, 54 are welded, the outer faces of such split band 54, 54 being ground to accurately fit the reamed, inner surface of the cylinder in which the plunger fits.

The ends of the specified, curved members are spaced apart slightly more than the width of the guide-bars 52 which are located in such gaps, and the cooperation of said bars with the ends of the parts 54 acts to prevent the piston or plunger from turning in the cylinder.

Members 54, 54 guide the reciprocatory movements of the lower end of the plunger in the cylinder, its upper part being guided by the sleeve of the gland 55 of a stuffing-box 56 held in place by the upper pins 49, 49.

Normally, the studs 51, 51, by coaction with the interrupted band 54, 54, limit the ascent of the piston or plunger, but to withdraw the latter from the cylinder it is merely necessary to lift it until the parts 54, 54 are above the top ends of the guide-bars 52, 52 and then to turn the plunger 90° to bring the gaps in the band 54, 54 into alignment with the pins 51, 49, thus permitting the entire withdrawal of the plunger, the space between the top faces of the bars 52 and the under surfaces of the lower pins 51, 51 being slightly greater than the vertical height of the members 54, 54.

From an understanding of the manner in which the plunger may be removed, it will be readily perceived how it may be replaced in proper position, which action can be facilitated by making the upper portions of the bars 52 somewhat tapered, as illustrated in Figure 4.

As in the other instance, the underside of the front-axle saddle 17 is equipped with a worm-sector 57 inside of the top, open, slotted end of the piston 16 and rockingly mounted therein on a shaft 58 oscillatory in suitable bearings secured in the piston, such worm-sector being in mesh with a worm 59 rotatably mounted in the piston and having a square hole through it for the temporary reception of the correspondingly-shaped part of a demountable, turning handle 61 (Figure 5) which can fit in the worm through a hole through the side-wall of the piston.

As in the previous case, the saddle 17 on the top of this piston has chains 62, 62 fastened at one end thereto and adapted to be tightened around the front axle 63 of the car by hand-operated, screw-threaded means 64.

Chamber 44 is at all times covered by two aligned plates 65 and 66 which slide over the surface of the floor and which are fastened to the truck or carriage 46 so that they all travel together as a unit, cover-plate 66 being apertured at 67, 67 at intervals along the length of the plate above a stationary, apertured fulcrum-plate 68 mounted on the lower flange of one of the channel-tracks 45 (see Figure 8).

When it is desired to adjust the position of cylinder 15, piston or plunger 16 and their carriage 46, toward or from the companion cylinder, plunger and rear-axle saddle, the operator inserts a lever 69 through one of the holes 67 in plate 66 and introduces its lower end into one of the apertures of the fixed fulcrum-plate 68, and then by rocking the lever in one direction or the other, as the case requires, he can move the truck and the parts which it carries to the required position, whereupon he removes the lever out of the way.

Pit 44 has a shelf 71 affording support for an oil-tank 72 containing the oil by means of which the pistons or plungers are slid upwardly in their cylinders, the top of such tank being connected by a pipe 73 and a control-valve 74 to a compressed-air pipe 75 which puts the required pressure on the surface of the oil in the tank, the oil being delivered under pressure from such receptacle through a discharge-pipe 76 extending down into the tank to a point near its bottom, piping 77 and two hand-controlled valves 78 and 79, valve 78 being connected by a pipe 81 to the interior of the top portion of cylinder 11, valve 79 being connected by swinging-joint piping 82 to the interior of the upper portion of the adjustable front-axle cylinder 15.

As is presented in Figure 1, a portion of pipe 81 extends through a larger pipe 83 connecting the compartment 18 with pit 44, so that any draining from the former may flow or pass into the latter from which accumulations may be occasionally removed.

The supplemental chamber 84 housing some of the piping and valves 78 and 79 referred to is equipped with a flat cover 85 which may be swung in a horizontal direction around its hinge pin 86 to open position, as illustrated in Figure 1, or to closed position over the chamber as presented in Figure 2.

The novel and improved appliance is operated substantially as follows:

Assuming that all of the parts are in their lowermost positions, as shown in Figure 2, the front-axle saddle 17 being just above the floor or ground level and the rear-axle seat below the ground or floor level and covered by the closed lids or trap-doors, and assuming further that both seats or saddles are in their horizontal or untilted positions, the vehicle to be raised is driven over the apparatus until its rear wheels drop into the depression member 33, 33.

By means of the lever or handle 69 introduced through one of the holes 67 in the plate 66 into one of the apertures of the fulcrum or rack plate 68, the front-axle carriage and its cylinder and plunger are adjusted to bring its saddle 17 directly under and in register with the front axle.

Assuming that the rear-axle differential-housing is off center with respect to the corresponding concealed saddle 14, the operator by means of the lever 41 whose lower end is fitted in the space between two of the cross-bars 39 forces the back end of the vehicle over to effect the centering operation, whereupon the differential-housing of the rear-axle assembly will be directly above the saddle.

Then by manipulating the valves 78, 79 the oil or other liquid is fed under pressure through the described piping into the top portions of the two cylinders around their plungers, such liquid feeding down to the spaces below the plungers through the gaps between the edges of the upright guide-bars 52 and the ends of the associated split-ring segments 54, 54 on the plungers causing the gradual ascent of both plungers which rise and engage their respective axles, the trap-doors opening automatically in the manner hereinbefore stated.

By controlling the valves the front and rear ends of the vehicle may be lifted equally, thereby preserving the horizontality of the automobile, or either end may be raised more rapidly than the other or in greater degree, as circumstances dictate.

If the two ends of the vehicle do not ascend equally, the front-axle saddle having engaged the axle, the front carriage and its cylinder and plunger will automatically shift position to conform themselves to whatever conditions may be present, this, of course, being brought about by the front axle carrying the saddle with it which necessitates a corresponding travel of the truck or carriage and its associated cylinder and plunger.

In some cases the vehicle may remain inclined forwardly or rearwardly to facilitate the accomplishment of some repair work.

In some instances, it is desirable to tilt the elevated vehicle sidewise so that it may be worked on at the top and at the bottom both at the same time, as for example, it might be well to remove the top of the cylinder block at the same time that the pan is being taken off from beneath.

This tip of the saddles to which the axles may be fastened by the chains and their tightening means is easily brought about by the turning of the worms and worm-wheels by the detachable handles 61.

The repair work having been completed, the saddles and vehicle are rocked back to horizontal position if they have been tilted, and by operation of the valves 78, 79 and an air-release valve 80, the vehicle can be lowered to the ground or floor again, the rear-axle saddle receding into its chamber which becomes automatically covered by the dropping lids or trap-doors.

In removing the rear wheels, any dirt and grease that falls from them or from the ends of the axles will be caught in the depression pans which are also likely to receive water and dirt from other sources, and the contents of these pans are drained through the pipes 38 into the chamber 18 from which they pass through the conduit 83 into the larger pit 44 from which the refuse may be removed from time to time, as occasion requires.

Incidentally, it may be interesting to note that owing to the fact that the pivotal or hinge mountings of the two saddles are located wholly inside of their respective plungers, the structures may be made such that the top portions of the plungers may descend inside of the packing-ring guides 55 but not far enough to come into contact with the packing itself.

It may be observed further that when either plunger rises so that its split band at its lower portion engages the abutments or stops 51, the pressure against the latter prevents the plunger from being rotated while in such upper position, so that upon descent of the plunger the gaps in its band 54 will still be in proper register with the guide-bars 52. In order to remove either piston from its cylinder in the manner stated hereinbefore, the employment of such pressure may be avoided, thus allowing the piston to be readily turned while in engagement with its stops or lugs.

The invention as defined by the appended claims is obviously not restricted to the precise details of structure illustrated and described, and these may be modified more or less without departure from the substance of the invention and without the loss of any of its material benefits.

I claim:

1. In a vehicle-lift, the combination of an upright cylinder closed at its lower end and open at its upper end, a hollow plunger slidable in said cylinder, a closure for the lower end of said plunger, a divided band on the lower portion of said plunger of larger external diameter than the outside diameter of said plunger and snugly fitting in said cylinder, a guide-bar fixed longitudinally in said cylinder and occupying the space provided by the division of said band, a stuffing-box at the upper end of said cylinder through which said plunger slides, means to admit fluid under pressure into and to permit the delivery of said fluid from the portion of said cylinder between the plunger and cylinder, and a saddle on said plunger adapted to engage and to raise and lower at least a portion of the vehicle.

2. The structure presented in claim 1 in combination with a projection inside of said cylinder and in the path of travel of said plunger-band, whereby engagement of said projection by said band limits the upward travel of said plunger, said projection normally being out of register with the division space of said band.

3. The structure presented in claim 1 in combination with a projection inside of said cylinder in the path of travel of said plunger-band, whereby engagement of said projection by said band limits the upward travel of said plunger, said projection being normally angularly out of register with the division space of said band, the upper end of said guide-bar and the under surface of said projection being spaced apart a distance greater than the width of said band, whereby said plunger may be removed from the cylinder by moving it upwardly sufficiently to carry the band beyond said guide-bar, then turning said plunger and band to bring the division space of the latter into register with said projection, and then withdrawing the plunger from the cylinder.

4. In a vehicle-lift, the combination of an upright cylinder, a plunger slidable in said cylinder, a saddle on said plunger adapted to support the rear portion of the vehicle, means to control the entrance of fluid under pressure into and its discharge from said cylinder to govern the elevation and descent of said plunger and its saddle, a truck movable horizontally in a pit below floor or ground level toward and from said cylinder, a second upright cylinder in said pit and mounted on and movable with said truck, a second plunger slidable in said second cylinder, a saddle on said second plunger adapted to support the front portion of the vehicle, means to control the admission of fluid under pressure into and its discharge from said second cylinder to govern the rise and descent of said second plunger and its saddle, cover-plate means for said pit secured to and movable with said truck and of a size to cover said pit in all positions of said truck, and means to move said cover-plate means and thereby correspondingly move said truck and its cylinder, plunger and saddle toward and from said first cylinder and comprising a series of apertures in said cover-plate means, a stationary apertured plate below said cover-plate means, and an independent bar adapted to have its lower part inserted through one of the upper cover-plate apertures into one of the lower stationary apertures to provide a fulcrum therefor.

5. In a vehicle-lift having a saddle adapted to support the rear portion of the vehicle by engagement with its rear-axle assembly and means to raise and lower said saddle and thereby elevate and lower said portion of the vehicle correspondingly, the combination of stationary wheel-locating seats below the floor or ground level on opposite sides of and in alignment with said saddle and adapted to receive the rear wheels of the vehicle to align its rear-axle assembly with said saddle.

6. The structure presented in claim 5 in which said locating seats have at least portions of their surfaces sloping in the direction of the saddle.

7. The structure presented in claim 5 in combination with fulcrum means associated with each of said locating seats, and means cooperating with said fulcrum means adapted to engage a wheel in either one of said seats and to force over the rear portion of the vehicle to center its rear-axle assembly with said saddle.

8. The structure presented in claim 5 in which said locating seats have at least portions of their surfaces sloping in the direction of said saddle and in combination with fulcrum means associated with each of said locating seats, and means cooperating with said fulcrum means to engage a wheel in either one of said seats and to force over the rear portion of the vehicle to center its rear-axle assembly with said saddle.

9. In a vehicle-lift having a saddle adapted to support the back portion of the vehicle by engagement with its rear-axle assembly and means to raise and lower said saddle and thereby elevate and lower said portion of the vehicle correspondingly, the combination of stationary locating seats on opposite sides of and in alignment with said saddle and adapted to receive the rear wheels of the vehicle to align its rear-axle assembly with said saddle, fulcrum means associated with each of said locating seats, and means cooperating with said fulcrum means to engage a wheel in either one of said seats and to force over the rear portion of the vehicle to center its rear-axle assembly with said saddle.

10. The structure presented in claim 9 in which said locating seats are below the floor or ground level.

11. In a vehicle-lift having a saddle adapted to support the back portion of the vehicle by engagement with its rear-axle assembly and means to raise and lower said saddle and thereby elevate and lower said portion of the vehicle correspondingly, the combination of stationary depression means below the floor or ground level and on opposite sides of and in alignment with said saddle and adapted to receive the rear wheels of the vehicle to align its rear-axle assembly with said saddle, a plurality of spaced bars in the lower portion of each of said depression means, and a lever adapted to cooperate with said bars and to bear on the face of the corresponding wheel in the depression means to force over the rear part of the vehicle to center its rear-axle assembly over said saddle.

12. In a vehicle-lift, the combination of a saddle adapted to support the back portion of the vehicle by engagement with its rear-axle assembly, means to raise and lower said saddle and thereby elevate and lower said portion of the vehicle correspondingly, a pit below the floor or ground level into which said saddle descends in its lowermost position, cover means for said pit at substantially floor or ground level which cover said saddle when the latter is in the pit, said cover means automatically opening to permit the ascent of the saddle and automatically closing when said saddle has decended into said pit, stationary depression means below the floor or ground level and at opposite sides of and in alignment with said saddle and adapted to receive the rear wheels of the vehicle to align its rear-axle assembly with said saddle while the latter is concealed below said cover means, fulcrum means associated with each of said depression means, and means cooperating with said fulcrum means to engage a wheel in either one of said depression means and to force over the rear portion of the vehicle to center its rear axle assembly with said saddle.

13. The structure presented in claim 12 in combination with drains connecting said depression means to said pit.

14. The structure presented in claim 12 in combination with drains connecting said depression means with said pit, a second saddle adapted to support the front portion of the vehicle, a second pit, means in said second pit to raise and lower said second saddle and the front portion of the vehicle supported thereby, and a drain connecting said first pit to said second pit.

15. In a vehicle-lift, the combination of two upright cylinders, plungers slidable in said cylinders, saddles rockingly mounted on the top portions of said plungers and adapted to engage and support the vehicle otherwise than by its wheels, means to control the admission of fluid under pressure into and its discharge from said cylinders to govern the ascent and descent of said plungers and their saddles and the vehicle supported thereby, operating means to rock said saddles on said plungers to tilt the elevated vehicle sidewise, and means to prevent the vehicle from displacement on said saddles when the vehicle is thus tilted.

16. In a vehicle-lift, the combination of an upright cylinder, a plunger slidable in said cylinder, means to admit fluid under pressure into said cylinder and to permit its discharge therefrom to raise and to lower said plunger, a saddle rockingly mounted at the top of said plunger and adapted to engage the vehicle, and means inside of the upper portion of said plunger to rock said saddle on said mounting.

17. The structure presented in claim 16 in combination with a detachable handle adapted to operate the rocking mounting of said saddle to tilt the saddle transversely of the length of the vehicle.

18. The structure presented in claim 4 in which each saddle is rockingly mounted on its corresponding plunger in combination with means inside the upper portion of each of said plungers to rock the corresponding saddle, and means to bind the vehicle to said saddles to prevent its displacement thereon due to its tilting movement.

19. In a vehicle-lift, the combination of a saddle adapted to support the back portion of the vehicle by engagement with its rear-axle assembly, means to raise and to lower said saddle and thereby elevate and lower said portion of the vehicle correspondingly, a pit below the floor or ground level into which said saddle descends in its lowermost position, cover-means for said pit at substantially floor or ground level which cover said saddle when the latter is in the pit and over which the vehicle may be driven, said cover-means automatically opening to permit the ascent of the saddle from the pit and automatically closing when said saddle has descended into the pit, and stationary depression means at opposite sides of and in alignment with said saddle and adapted to receive the rear wheels of the vehicle to align its rear-axle assembly with said saddle while the latter is concealed below said cover-means.

IRA A. WEAVER.